US011724716B2

(12) United States Patent
Xia et al.

(10) Patent No.: US 11,724,716 B2
(45) Date of Patent: Aug. 15, 2023

(54) METHOD AND APPARATUS OF DETERMINING GUIDE PATH, METHOD AND APPARATUS OF CONTROLLING DRIVING OF VEHICLE, AND ELECTRONIC DEVICE

(71) Applicant: Beijing Baidu Netcom Science Technology Co., Ltd., Beijing (CN)

(72) Inventors: Liming Xia, Beijing (CN); Kai Yang, Beijing (CN); Jingchao Feng, Beijing (CN); Pengjie Zheng, Beijing (CN); Tianxiang Cui, Beijing (CN); Mingsong Wang, Beijing (CN); Yanting Chen, Beijing (CN); Rongjing Shang, Beijing (CN); Jiaxin Sun, Beijing (CN); Haitao Liu, Beijing (CN); Xiaochuan Du, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 163 days.

(21) Appl. No.: 17/185,717

(22) Filed: Feb. 25, 2021

(65) Prior Publication Data

US 2022/0081001 A1 Mar. 17, 2022

(30) Foreign Application Priority Data

Sep. 15, 2020 (CN) .......................... 202010970793.5

(51) Int. Cl.
*B60W 60/00* (2020.01)
*B60W 30/095* (2012.01)
*B60W 40/072* (2012.01)

(52) U.S. Cl.
CPC ...... *B60W 60/0011* (2020.02); *B60W 30/095* (2013.01); *B60W 40/072* (2013.01);
(Continued)

(58) Field of Classification Search
CPC ......... B60W 60/0011; B60W 60/0016; B60W 60/005; B60W 30/095; B60W 40/072; B60W 2556/50; B60W 2552/30
See application file for complete search history.

(56) References Cited

U.S. PATENT DOCUMENTS 10,268,191 B1 * 4/2019 Lockwood ........... G05D 1/0038
10,882,537 B2 * 1/2021 Engle .................... B60W 50/14
(Continued)

FOREIGN PATENT DOCUMENTS

JP 2020-131897 8/2020
KR 10-2020-0019191 2/2020
(Continued)

OTHER PUBLICATIONS

Extended European Search Report, issued in the corresponding European patent application No. 21159571.5, dated Apr. 9, 2021, 10 pages.

(Continued)

*Primary Examiner* — Yazan A Soofi
*Assistant Examiner* — Naeem Taslim Alam
(74) *Attorney, Agent, or Firm* — Hamre, Schumann, Mueller & Larson, P.C.

(57) ABSTRACT

The present disclosure provides a method and apparatus of determining a guide path, and a method and apparatus of controlling driving of a vehicle. The method of determining the guide path may be performed by a monitoring platform and includes: displaying a map for a predetermined range of a vehicle in response to receiving a guide request transmitted by the vehicle, wherein the map includes a plurality of first track points for the vehicle; changing a position of at least one of the plurality of first track points in the map in response to a target operation on the at least one first track point, so as to obtain a plurality of second track points;

(Continued)

determining the guide path for the vehicle according to the plurality of second track points; and transmitting path information indicative of the guide path to the vehicle.

15 Claims, 8 Drawing Sheets

(52) U.S. Cl.
CPC ...... *B60W 60/005* (2020.02); *B60W 60/0016* (2020.02); *B60W 2552/30* (2020.02); *B60W 2556/50* (2020.02)

(56) References Cited

U.S. PATENT DOCUMENTS

| | | | | |
|---|---|---|---|---|
| 11,328,593 | B2* | 5/2022 | Urano | G08G 1/166 |
| 2016/0114794 | A1* | 4/2016 | Sakaguchi | B60W 30/18145 |
| | | | | 701/72 |
| 2016/0334798 | A1* | 11/2016 | Foster | A01B 69/008 |
| 2017/0192431 | A1* | 7/2017 | Foster | G05D 1/0217 |
| 2017/0293304 | A1* | 10/2017 | Dang | G05D 1/021 |
| 2017/0305420 | A1* | 10/2017 | Desens | B60W 50/14 |
| 2018/0188051 | A1* | 7/2018 | Gaspard-Bou | G08G 5/0039 |
| 2018/0321688 | A1* | 11/2018 | Chase | G05D 1/0022 |
| 2019/0163176 | A1* | 5/2019 | Wang | G05D 1/0027 |
| 2019/0196464 | A1 | 6/2019 | Lockwood et al. | |
| 2019/0359228 | A1* | 11/2019 | Banno | G09G 5/38 |
| 2020/0004240 | A1 | 1/2020 | Biehler et al. | |
| 2020/0086888 | A1* | 3/2020 | Engle | G05D 1/0214 |
| 2020/0387852 | A1* | 12/2020 | Iida | G06Q 10/083 |
| 2021/0046977 | A1* | 2/2021 | Zhang | B60W 10/20 |
| 2021/0146998 | A1* | 5/2021 | Niewiadomski | B60D 1/62 |
| 2022/0068139 | A1* | 3/2022 | Brandon | G06Q 10/02 |

FOREIGN PATENT DOCUMENTS

| | | |
|---|---|---|
| WO | 2018087879 | 5/2018 |
| WO | 2018/232032 | 12/2018 |
| WO | 2019077739 | 4/2019 |

OTHER PUBLICATIONS

European Office Action, issued in the corresponding European patent application No. 21159571.5, dated Dec. 14, 2021, 7 pages.

* cited by examiner

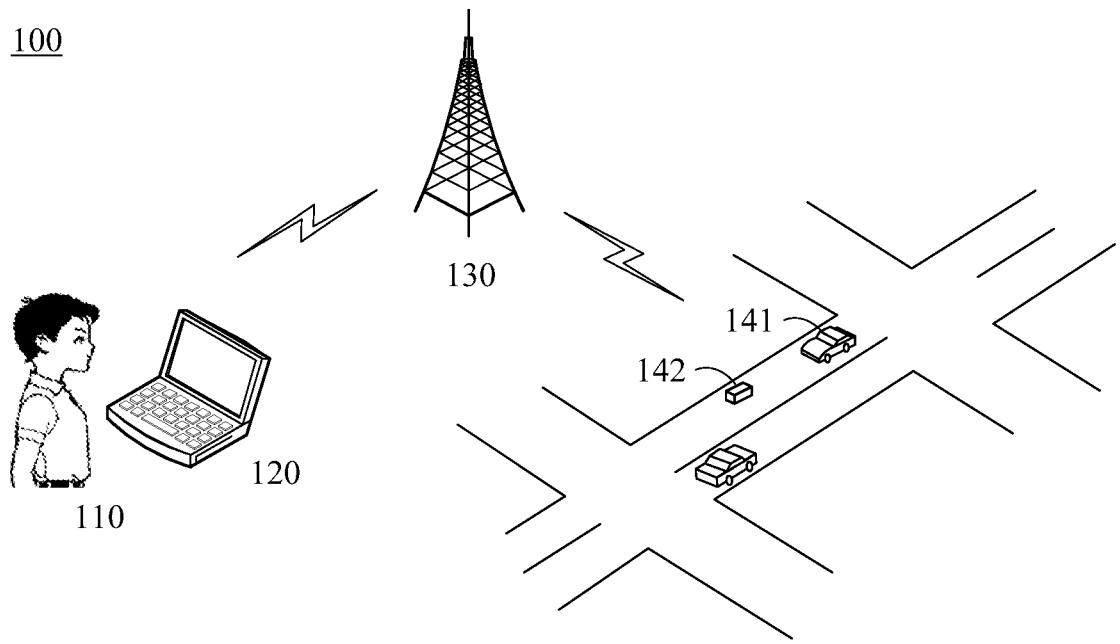

Determining, according to environmental information of a road ahead, whether a driving path of the road ahead has been planned or not, when the vehicle is in the autonomous-driving mode — S210

Transmitting a guide request to the monitoring platform if the driving path of the road ahead hasn't been planned — S230

Receiving path information transmitted by the monitoring platform in response to the guide request — S250

FIG.2

METHOD AND APPARATUS OF DETERMINING GUIDE PATH, METHOD AND APPARATUS OF CONTROLLING DRIVING OF VEHICLE, AND ELECTRONIC DEVICE

CROSS REFERENCE TO RELATED APPLICATIONS

This application claims priority to the Chinese Patent Application No. 202010970793.5 filed on Sep. 15, 2020, which is incorporated herein by reference in its entirety.

TECHNICAL FIELD

The present disclosure relates to a field of information processing, specifically to a field of autonomous driving and a field of intelligent guidance, and more specifically to a method and an apparatus of determining a guide path, a method and an apparatus of controlling driving of a vehicle, an electronic device, and a non-transitory computer-readable storage medium.

BACKGROUND

In an unmanned self-driving operation stage of a vehicle, in order to improve a level of automation, an autonomous vehicle is generally not staffed by assistant persons. However, when the vehicle encounters an unavoidable obstacle or fails to automatically plan a path due to traffic control, road construction, or the like, the vehicle may get into trouble and generally cannot get out of the trouble automatically.

By the method of assigning assistant personnel to the vehicle in trouble, the vehicle may be helped to get out of the trouble. However, because it is necessary to wait for the assistant person to arrive at the site, the method may cause delay in handling, which easily causes problems such as traffic jams and high labor costs.

SUMMARY

The present disclosure provides a method and an apparatus of determining a guide path, a method and an apparatus of controlling driving of a vehicle, an electronic apparatus, and a storage medium.

According to a first aspect, the present disclosure provides a method of determining a guide path, including: displaying a map for a predetermined range of a vehicle in response to receiving a guide request transmitted by the vehicle, wherein the map includes a plurality of first track points for the vehicle; changing a position of at least one of the plurality of first track points in the map in response to a target operation on the at least one first track point, so as to obtain a plurality of second track points; determining the guide path for the vehicle based on the plurality of second track points; and transmitting path information indicative of the guide path to the vehicle, so as to enable the vehicle to travel along the guide path.

According to a second aspect, the present disclosure provides a method of controlling driving of a vehicle, including: determining in an autonomous-driving mode of the vehicle, based on environmental information of a road ahead, whether a driving path of the road ahead has been planned or not; transmitting a guide request to a monitoring platform, in response to determining that the driving path of the road ahead hasn't been planned; and receiving path information transmitted by the monitoring platform in response to the guide request, so as to enable the vehicle to travel along a guide path indicated by the path information.

According to a third aspect, the present disclosure provides an apparatus of determining a guide path, including: an information displaying module configured to display a map for a predetermined range of a vehicle in response to receiving a guide request transmitted by the vehicle, wherein the map includes a plurality of first track points for the vehicle; a position changing module configured to change a position of at least one of the plurality of first track points in the map in response to a target operation on the at least one first track point, so as to obtain a plurality of second track points; a path determination module configured to determine the guide path for the vehicle based on the plurality of second track points; and an information transmission module configured to transmit path information indicative of the guide path to the vehicle so as to enable the vehicle to travel along the guide path.

According to a fourth aspect, the present disclosure provides an apparatus of controlling driving of a vehicle, including: a path determination module configured to determine in an autonomous-driving mode of the vehicle, based on environmental information of a road ahead, whether a driving path of the road ahead has been planned or not; a request transmission module configured to transmit a guide request to a monitoring platform in response to determining that the driving path of the road ahead hasn't been planned; and an information receiving module configured to receive path information transmitted by the monitoring platform in response to the guide request, so as to enable the vehicle to travel along a guide path indicated by the path information.

According to a fifth aspect, the present disclosure provides an electronic device, including: at least one processor; and a memory in communication with the at least one processor; wherein the memory stores instructions executable by the at least one processor, and wherein the instructions, when executed by the at least one processor, cause the at least one processor to perform the above-mentioned method of determining the guide path or method of controlling driving of the vehicle.

According to a sixth aspect, the present disclosure provides a non-transitory computer-readable storage medium having computer instructions stored thereon, wherein the computer instructions, when executed, cause a computer to perform the above-mentioned method of determining the guide path or method of controlling driving of the vehicle.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The drawings are used to better understand the solution and do not constitute a limitation to the present disclosure, in which:

FIG. 1 shows an application scenario diagram of a method and an apparatus of determining a guide path, and a method and an apparatus of controlling driving of a vehicle according to embodiments of the present disclosure;

FIG. 2 shows a schematic flowchart of a method of controlling driving of a vehicle according to an embodiment of the present disclosure;

DETAILED DESCRIPTION

Figure 3:
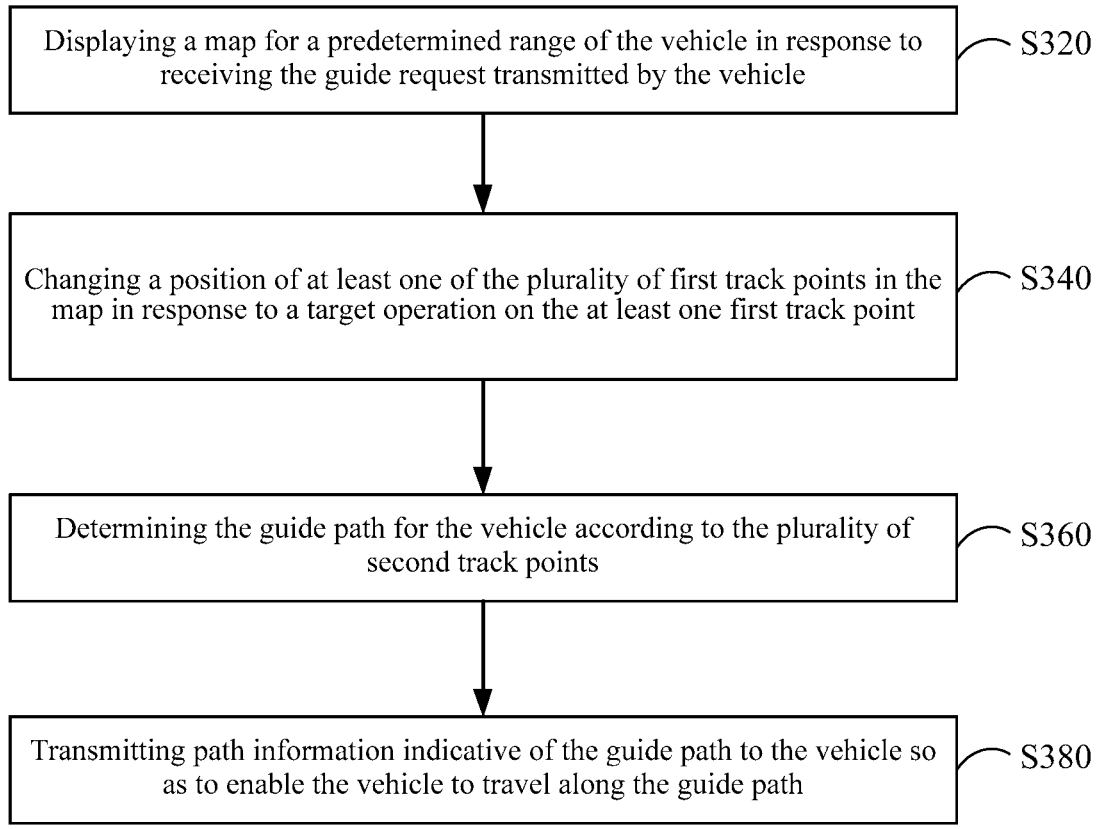
FIG. 3 shows a schematic flowchart of a method of determining a guide path according to an embodiment of the present disclosure.

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

FIG. 1 shows an application scenario diagram of a method and an apparatus of determining a guide path, and a method and an apparatus of controlling driving of a vehicle according to the embodiments of the present disclosure.

As shown in FIG. 1, an application scenario 100 in the embodiments of the present disclosure includes a monitoring person 110, a terminal 120, a communication base station 130, and a road traffic network. The road traffic network may include a two-way road, on which there are a plurality of vehicles. The road traffic network may include, for example, a two-way road composed of two single lanes with opposite driving directions.

Exemplarily, as shown in FIG. 1, the plurality of vehicles on the two-way road may include, for example, an autonomous vehicle 141. The autonomous vehicle 141 is provided with a camera for collecting environmental information around the vehicle and a distance sensor for sensing a distance between the vehicle and surrounding objects. The autonomous vehicle 141 may perform remote communication with the terminal 120 through the communication base station 130 so as to achieve interaction with the terminal 120.

Exemplarily, the application scenario 100 may further include monitors arranged on both sides of the road. The monitors are used to monitor environmental information and transmit the environmental information to the terminal 120 via the communication base station 130, so that the terminal may render and generate a map according to the environmental information. The environmental information may include, for example, a road where the vehicle is located, a position of a lane line of the road where the vehicle is located, an object (for example, an obstacle) on the road and a position of the object, a boundary line of the road, a position of a lane line of another road adjacent to the road, and so on. In an embodiment, the environmental information may further include weather conditions, for example. The weather conditions may be embodied according to, for example, brightness of a screen obtained by monitoring, a clarity of objects in the screen, and so on. For example, if the brightness of the screen is high, the weather condition is a sunny weather.

Exemplarily, the terminal 120 may be, for example, a server, a desktop computer or a laptop portable computer with monitoring functions and information display functions. The terminal 120 may be installed with various client applications on which a monitoring platform may be installed and run to render and generate a map based on the environmental information. The server may be, for example, a server of a distributed system or a server combined with a blockchain.

Exemplarily, the autonomous vehicle 141 may be set in at least an autonomous-driving mode and an assistant-driving mode. In the autonomous-driving mode, the autonomous vehicle 141 may automatically plan a driving path based on the environmental information collected by the camera, the distance to other objects detected by the distance sensor, and the traffic rules and road driving rules stored in the memory or obtained from the cloud, and may travel along the driving path. In the assistant-driving mode, the autonomous vehicle 141 may communicate with the terminal 120 to obtain a guide path planned by the terminal 120, and travel along the guide path.

As shown in FIG. 1, in the case where there is an obstacle 142 on the road ahead of the autonomous vehicle 141, and the existence of the obstacle 142 prevents the autonomous vehicle 141 from passing a road section where the obstacle 142 is located in a single lane, the autonomous vehicle 141 fails to plan the driving path of the road ahead and thus stops driving and is trapped near the obstacle 142. In this case, in the related art, it is necessary to assign an assistant person to the site where the autonomous vehicle 141 is located, and drive the autonomous vehicle 141 away from the obstacle 142 through manual assistant driving, so that the driving path may be re-planned and the autonomous driving may be performed.

In the embodiment of the present disclosure, when the autonomous vehicle 141 fails to plan the driving path of the road ahead, a guide request may be transmitted to the terminal 120 via the communication base station 130. The terminal 120 may obtain the guide path in response to an operation of the assistant person, and transmit the guide path to the autonomous vehicle 141 via the communication base station 130. The autonomous vehicle 141 may travel along the guide path in the assistant-driving mode, so as to achieve the same effect as manual assistant driving of the assistant person in the site where the autonomous vehicle 141 is located. In this way, the assistant person may plan guide paths for plurality of autonomous vehicles 141 at the terminal 120. Compared with the technical solution of assigning the assistant person to each autonomous vehicle that requests guidance, it may effectively reduce labor costs and improve assistance efficiency.

It should be noted that the method of determining the guide path provided in the embodiment of the present disclosure may generally be performed by the terminal 120, and specifically may be performed by the monitoring platform installed in the terminal 120. The method of controlling driving of the vehicle provided in the embodiment of the present disclosure may generally be performed by the autonomous vehicle 141.

It should be understood that the numbers and types of terminals, roads, vehicles, obstacles, and communication base stations in FIG. 1 are merely illustrative. According to implementation needs, there may be any numbers and types of terminals, roads, vehicles, obstacles and communication base stations. The case described in the application scenario in FIG. 1 in which the autonomous vehicle fails to plan the driving path of the road ahead due to the existence of the obstacle is only an example. In other embodiments, the autonomous vehicle may fail to plan the driving path of the road ahead due to restrictions on the control accuracy of the autonomous vehicle and the minimum allowable distance from the obstacle in the case where the autonomous vehicle encounters road construction, road damage, narrow or congested roads, road traffic control, and the like.

Hereinafter, the method of controlling driving of the vehicle and the method of determining the guide path in the embodiments of the present application will be described below in detail with reference to FIGS. 2 to 8 in combination with FIG. 1.

FIG. 2 shows a schematic flowchart of a method of controlling driving of a vehicle according to an embodiment of the present disclosure.

As shown in FIG. 2, a method 200 of controlling driving of a vehicle of this embodiment may include operation S210 to operation S250.

In operation S210, determining, according to the environmental information of the road ahead, whether a driving path of the road ahead has been planned or not, when the vehicle is in the autonomous-driving mode.

In operation S230, transmitting a guide request to the monitoring platform if the driving path of the road ahead hasn't been planned.

In operation S250, receiving path information transmitted by the monitoring platform in response to the guide request, so as to enable the vehicle to travel along the guide path indicated by the path information.

According to the embodiment of the present disclosure, the autonomous vehicle may plan the driving path of the road ahead in the autonomous-driving mode according to the environmental information collected by the camera, a preset destination, the distance information detected by the distance sensor, and the driving rules and traffic rules of the road where the vehicle is located. If no driving path of the road ahead has been planned within the preset time period, it may be determined that the autonomous vehicle will be trapped in front, and then a guide request is transmitted to the monitoring platform (specifically, to the terminal), so that the terminal determines, in response to the guide request, whether to perform assistant driving on the autonomous vehicle. If it is determined to perform assistant driving on the autonomous vehicle, the guide request is transmitted to the monitoring platform to receive a guide path planned by the monitoring platform for the autonomous vehicle, so as to enable the autonomous vehicle to travel along the guide path to get out of the trouble. The preset time period may be any value such as 30 s, 1 min, and the like. In an embodiment, the autonomous vehicle may also determine that it is trapped and may transmit the guide request to the monitoring platform when it has been stagnant for a predetermined time period and the driving path has not been planned.

Exemplarily, when the autonomous vehicle fails to plan the driving path of the road ahead and has travelled to an end of the driving path that has been planned before, a driving mode of the autonomous vehicle may be, for example, automatically switched from the autonomous-driving mode to the assistant-driving mode, or may be switched from the autonomous-driving mode to a single-pedal mode to wait to receive the guide path. In this case, a speed of the autonomous vehicle is 0, and a driving gear remains unchanged. The single-pedal mode refers to a mode in which operations such as starting, driving, decelerating and so on may be performed only by controlling the switch pedal.

According to the embodiment of the present disclosure, the path information received by the autonomous vehicle may include a coordinate value of each of a plurality of track points in the guide path planned by the monitoring platform in a physical coordinate system, a curvature value and a path length of a driving path between two adjacent track points of the plurality of track points, and other information. After receiving the path information, the autonomous vehicle may first obtain the planned guide path according to the path information, and then travel along the guide path. It should be noted that the guide path planned by the monitoring platform may, for example, have a predetermined zoom factor relationship with the guide path along which the autonomous vehicle actually travels. That is, the guide path in the actual traveling may be obtained by magnifying the guide path planned by the monitoring platform by multiples. The predetermined zoom factor may be 0.01, 0.005, and other values far less than 1, for example.

Exemplarily, the guide request transmitted by the vehicle to the monitoring platform may include identification information of the vehicle and/or location information of the vehicle, so that the monitoring platform may position the vehicle that transmitted the guide request from the plurality of monitored vehicles according to the identification information and/or location information. The identification information may be, for example, a license plate number of the vehicle, a factory serial number of the vehicle, and the like.

Exemplarily, the guide path may be generated by the terminal through the method of determining the guide path as described in FIG. 3, for example.

FIG. 3 shows a schematic flowchart of a method of determining a guide path according to an embodiment of the present disclosure.

As shown in FIG. 3, a method 300 of determining a guide path of this embodiment may include, for example, operation S320 to operation S380.

In operation S320, displaying a map for a predetermined range of the vehicle in response to receiving the guide request transmitted by the vehicle, and the map includes a plurality of first track points for the vehicle.

According to the embodiment of the present disclosure, after receiving the guide request, the monitoring platform may first determine a position of the vehicle in the monitored three-dimensional image according to the guide request, for example. Then, a partial image located within the predetermined range of the vehicle is determined with this position as a center, and a plurality of points on the road ahead of the vehicle are added to the partial image as first track points. Finally, the map is obtained by magnifying and displaying the partial image with the plurality of first track points added. The three-dimensional image monitored by the monitoring platform may be obtained by splicing and rendering images monitored by a plurality of monitors along the road.

According to the embodiment of the present disclosure, after the partial image with a plurality of first track points added is obtained, a plan view of a plane where the vehicle is located, for example, may be rendered and obtained according to the partial image, and the plan view obtained is displayed as the map. The plan view obtained by rendering may facilitate the determination of the distance between each first track point and the vehicle, thereby facilitating the planning and determination of the guide path.

Exemplarily, the monitoring platform may determine the position of the vehicle from the monitored three-dimensional image according to the identification information and/or location information contained in the guide request. In other embodiments, after determining the position of the vehicle, the monitoring platform may further render the vehicle that transmitted the guide request in the monitored three-dimensional image into a color with high saturation such as red and yellow, or the vehicle that transmitted the guide request may be enlarged, so as to highlight the vehicle and facilitate the detection of the assistant person.

Exemplarily, after the monitoring platform receives the guide request, firstly, for example, a selection control may be added to the monitored three-dimensional image, and the vehicle that transmitted the guide request may be highlighted in the monitored three-dimensional image. The map is then displayed in response to an operation of the selection control. In this way, after knowing that the guide request is received according to the highlighted vehicle, the assistant person may plan the guide path or not by operating the selection control or not, so as to prevent time-wasting if the vehicle is unable to get out of the trap through the guide path but the monitoring platform has to plan the guide path. In an embodiment, the assistant person may be trained in advance, for example, so as to be able to accurately determine whether the guide path may help the vehicle get out of trouble.

In operation S340, changing a position of at least one of the plurality of first track points in the map in response to a target operation on the at least one first track point, so as to obtain a plurality of second track points.

According to an embodiment of the present disclosure, the monitoring platform may change a position of any first track point to a position of a drag operation in response to detecting the drag operation of the first track point in the map by an input device, until no drag operation of the plurality of first track points by the input device is detected within the preset time period, and the plurality of first track points at the current position are determined to be a plurality of second track points. The operation of the input device on the first track points may be detected in response to the operation of the assistant person on the input device. The input device may be, for example, a mouse, a stylus pen, and/or a joystick. The preset time period in this embodiment may be any time period such as 30 s, 1 min, etc., which is not limited in this embodiment.

In operation S360, determining the guide path for the vehicle according to the plurality of second track points.

According to the embodiment of the present disclosure, the guide path may be obtained by a curve fitting method according to the plurality of second track points. The curve fitting method may be, for example, least squares fitting or Bezier curve fitting, which is not limited in the present disclosure.

In operation S380, transmitting path information indicative of the guide path to the vehicle so as to enable the vehicle to travel along the guide path.

According to the embodiment of the present disclosure, after the guide path is determined, the curvature value, path length, path zoom factor of the driving path between two adjacent second track points in the guide path and the coordinate values of the two adjacent second track points in the physical coordinate system may be determined, and the coordinate values of the two adjacent second track points and the information about the driving path therebetween are used as a set of information. In this way, a plurality of sets of information may be obtained, and the plurality of sets of information constitute the path information indicative of the guide path.

Figure 4:
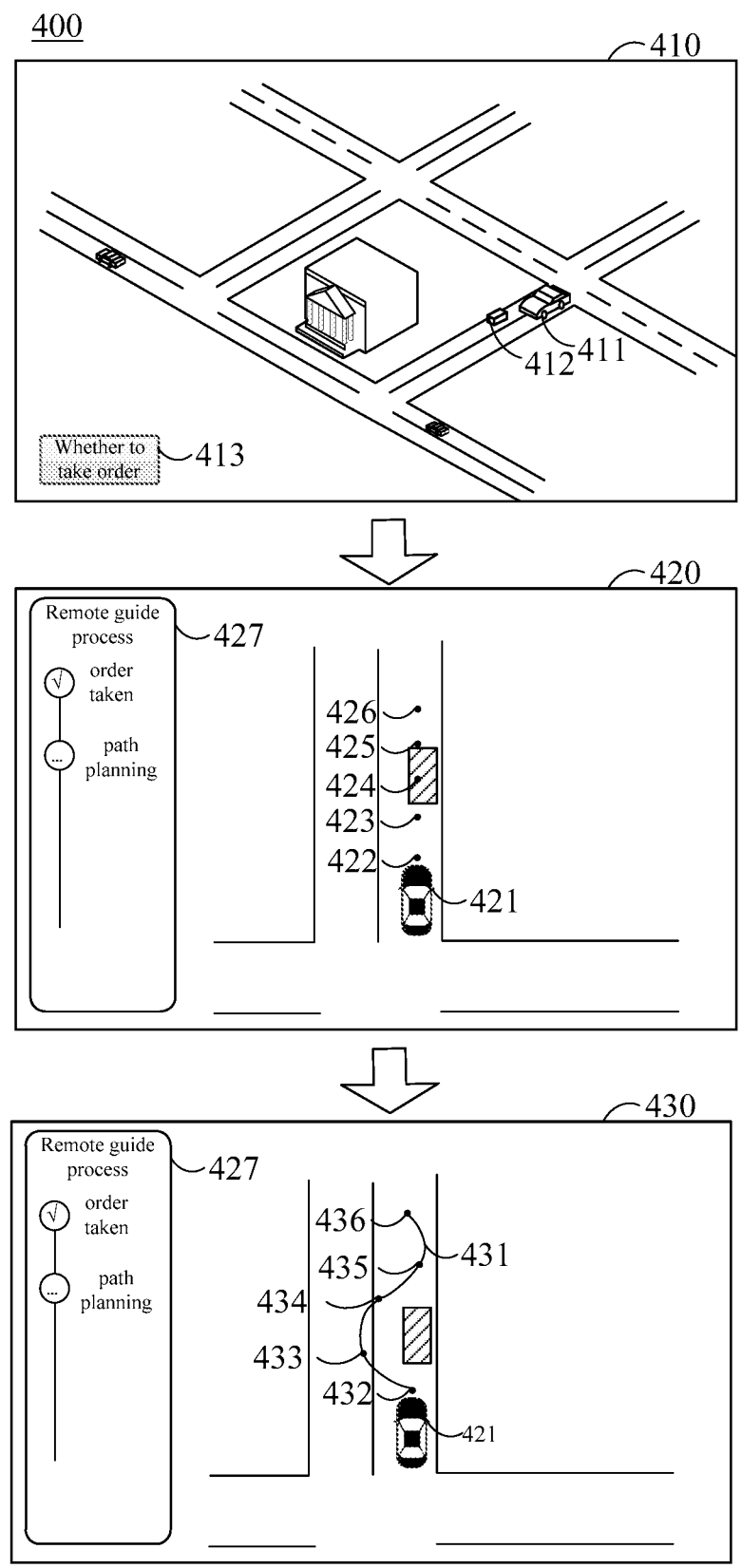
FIG. 4 shows a schematic diagram of a display page in the process of determining a guide path according to an embodiment of the present disclosure.

FIG. 4 shows a schematic diagram of a display page in the process of determining a guide path according to an embodiment of the present disclosure.

Exemplarily, as shown in FIG. 4, in a scenario 400, if the autonomous vehicle 411 transmits the guide request due to an obstacle 412 in front, the monitoring platform may, after receiving the guide request, enlarge and display the autonomous vehicle 411 in the three-dimensional image monitored by the monitoring platform according to the guide request, and a selection control 413 showing "whether to take the order" is added to the current display page 410. If the assistant person clicks on the selection control through the input device, it may indicate that the assistant person chooses to plan the guide path. In this case, the display page 410 may be switched to a display page 420. The display page 420 may be, for example, a two-dimensional image formed by rending the three-dimensional image within the predetermined range of the position of the autonomous vehicle 411 on the display page 410. The two-dimensional image may be, for example, an image of a top view angle within the predetermined range, as the above-mentioned map.

As shown in FIG. 4, the map shows five first track points 422-426 for the vehicle, which may be periodically arranged in the driving direction of the autonomous vehicle 421. As shown in FIG. 4, the display page 420 may further show a guide process box 427 to display a remote guide process, so as to facilitate the assistant person to know the current assistance progress. After the assistant person clicks on the selection control through the input device, "order taken" process step is completed and the process proceeds to "path planning" process step. The symbols before each process step indicate the progress of each process step. If the symbol before the process step is a check mark, it indicates that the process step has been completed, and if the symbol before the process step is " . . . ", it indicates that the process step is in progress.

Exemplarily, each of the five first track points 422-426 in FIG. 4 may move forward or backward in the driving direction of the vehicle or move left or right in the width direction of the vehicle in response to the drag operation or click operation of the input device.

In an embodiment, the positions of the track point 423, the track point 424, the track point 425 and the track point 426 in the five first track points 422-426 may be changed in response to operations on these track points, and no drag operation of the five first track points 422-426 by the input device is detected within the preset time period, then five second track points 432-436 on the display page 430 in FIG. 4 are obtained. According to the five second track points 432-436, a guide track 431 as shown on the display page 430 is generated.

In the embodiment of the present disclosure, the monitoring platform obtains the guide path in response to the operation on the track points, and transmits the guide path to the vehicle 421. The vehicle 421 may travel along the guide path, which achieves the same effect as manual driving of the assistant person in the site where the vehicle 421 is located. In this way, the assistant person may plan guide paths for a plurality of autonomous vehicles 141 at the monitoring platform. Compared with the technical solution of assigning the assistant person to each autonomous vehicle that requests guidance, it may effectively reduce labor costs and improve assistance efficiency.

Figure 5:
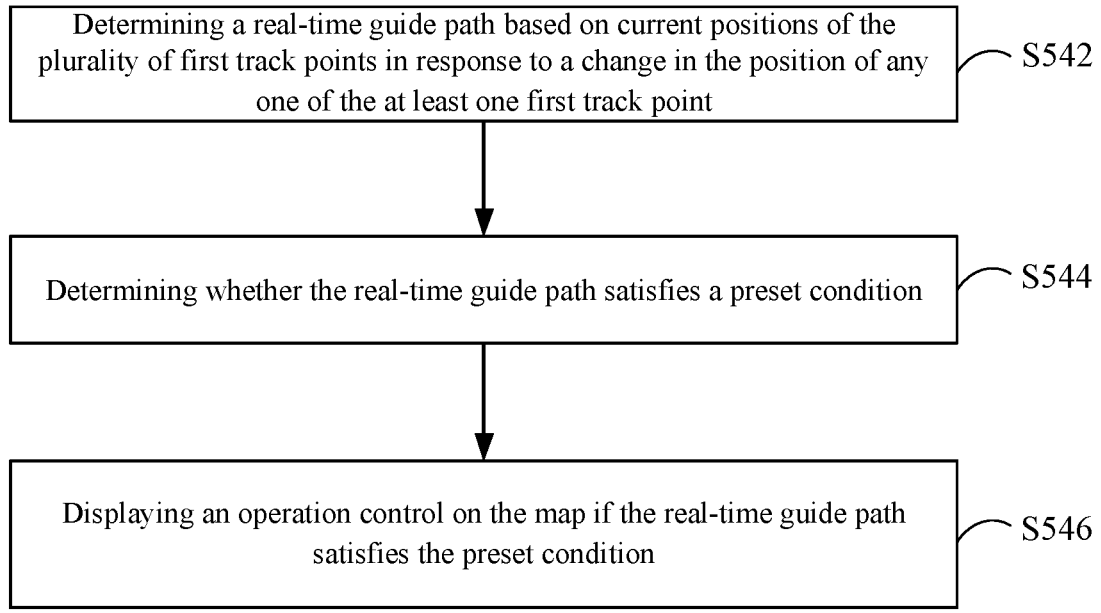
FIG. 5 shows a schematic flowchart of changing a position of a first track point to obtain second track points according to an embodiment of the present disclosure.

FIG. 5 shows a schematic flowchart of changing a position of a first track point to obtain second track points according to an embodiment of the present disclosure.

According to the embodiment of the present disclosure, as shown in FIG. 5, the process of changing the position of at least one first track point in the map to obtain the plurality of second track points in this embodiment may include, for example, operation S542 to operation S546, so as to improve the rationality and accuracy of the guide path determined according to the plurality of second track points obtained after changing the position.

In operation S542, determining a real-time guide path based on the current positions of the plurality of first track points in response to a change in the position of any one of the at least one first track point.

According to the embodiment of the present disclosure, after the position of any first track point is changed, the real-time guide path may be obtained by the curve fitting method according to the current positions of the plurality of first track points. The curve fitting method may be, for example, least squares fitting or Bezier curve fitting, which is not limited in the present disclosure.

In operation S544, determining whether the real-time guide path satisfies a preset condition.

According to the embodiment of the present disclosure, a curvature threshold may be set for the real-time guide path in advance, so as to avoid the situation that the vehicle fails to travel due to the excessive curvature of the guide path. The curvature threshold may be, for example, any value not greater than 0.5, which may be set according to actual requirements and is not limited in the present disclosure.

Exemplarily, in operation S544, firstly, the curvature value of a path between two adjacent first track points in the real-time guide path may be determined, so as to obtain a plurality of curvature values. Then, the plurality of curvature values are compared with the curvature threshold to determine whether the plurality of curvature values include a value greater than the curvature threshold. In the case of no value greater than the curvature threshold, it is determined that the real-time guide path satisfies the preset condition, or otherwise, it is determined that the real-time guide path does not satisfy the preset condition.

Exemplarily, in operation S544, the maximum curvature value of the plurality of curvature values may be determined firstly, that is, the maximum curvature value of the real-time guide path is determined. The maximum curvature value is compared with the curvature threshold. If the maximum curvature value is not greater than the curvature threshold, it is determined that the real-time guide path satisfies the preset condition, or otherwise, it is determined that the real-time guide path does not satisfy the preset condition.

According to the embodiment of the present disclosure, a path length threshold may be set for the guide path in advance, so as to reduce the intervention of the assistant person in the driving of the autonomous vehicle. The path length threshold may be, for example, any value not greater than 50 m, which may be set according to actual requirements and is not limited in the present disclosure.

Exemplarily, in operation S544, a path length of the real-time guide path may be determined first. Then the path length of the real-time guide path is compared with the path length threshold. If the path length is not greater than the length threshold, it is determined that the real-time guide path satisfies the preset condition, or otherwise, it is determined that the real-time guide path does not satisfy the preset condition.

Exemplarily, in operation S544, the maximum curvature value and the path length of the real-time guide path may be determined first. Then the maximum curvature value is compared with the curvature threshold, and the path length is compared with the path length threshold. If the maximum curvature value is not greater than the curvature threshold and the path length is not greater than the path length threshold, it is determined that the real-time guide path satisfies the preset condition, or otherwise, it is determined that the real-time guide path does not satisfy the preset condition. In this way, it is possible to avoid the situation that the curvature of the finally determined guide path is too large for the vehicle to travel, thereby ensuring the rationality and accuracy of the determined guide path, and it is also possible to reduce human intervention during the driving of the autonomous vehicle.

In operation S546, displaying an operation control on the map if the real-time guide path satisfies the preset condition, so as to obtain a plurality of second track points in response to an operation on the operation control.

Exemplarily, the operation control may be, for example, a control for confirming whether the position change of the first track point is completed. In response to the operation of the operation control, it is determined that the position change of the first track point is completed, and the first track points at the current position are taken as the second track points.

Figure 6:
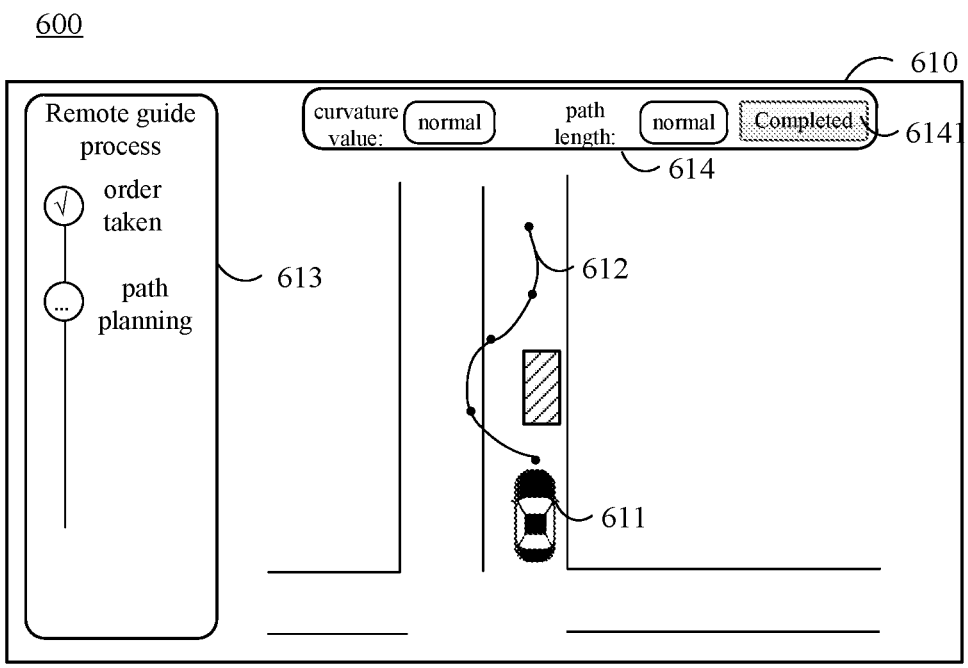
FIG. 6 shows a schematic diagram of a display page in the process of determining a plurality of second track points according to an embodiment of the present disclosure.

FIG. 6 shows a schematic diagram of a display page in the process of determining the plurality of second track points according to an embodiment of the present application.

Schematically, as shown in FIG. 6, in a scenario 600, in the process of changing the position of the first track point in response to the target operation on the first track point, a real-time guide path for a vehicle 611 is obtained according to the current positions of the plurality of first track points. Further, in the case where it is determined that the real-time guide path satisfies the preset condition, an operation control 6141 (for example, a "complete" control) may be displayed on the display page 610. In response to a click operation of the operation control 6141 by the input device, it may be determined that the change of the positions of the plurality of first track points is completed, and the plurality of second track points are obtained. Based on the plurality of second track points, for example, a guide path 612 may be formed.

Schematically, as shown in FIG. 6, the display page 610, for example, may also display an information box 614 showing information indicating whether the real-time guide path determined according to the positions of the plurality of first track points satisfies the preset condition.

Exemplarily, in the case where the real-time guide path satisfies the preset condition, the information box 614 may display the words "curvature value: normal" and "path length: normal", for example. In the case where the maximum curvature value of the real-time guide path is greater than the curvature threshold and the path length is not greater than the path length threshold, the information box may display the words "curvature value: 0.5" and "path length: normal", for example. Similarly, if the maximum curvature value is greater than the curvature threshold, the specific value of the maximum curvature value is displayed, or otherwise, the words "curvature value: normal" are displayed. If the path length is greater than the path length threshold, the specific value of the path length is displayed, otherwise the words "path length: normal" are displayed. With the display of the information in the information box, assistant information may be provided to the assist person to change the position of the first track point through the input device, which is convenient for quickly determining how to change the position of the first track point.

Exemplarily, the operation control may be continuously displayed on the display page 610 after the "order taken" process step displayed in the guide process box 613 is completed and the process step "path planning" is in progress. However, the operation control is in a disabled state when the real-time guide path does not satisfy the preset condition, and in a normal state when the real-time guide path satisfies the preset conditions. Through the setting of the operation control, the monitoring platform may change the position of the track point only when the real-time guide path satisfies the preset condition, thereby ensuring the correctness of the guide path determined according to the second track points.

According to the embodiment of the present disclosure, the guide path determined may be verified, and only when it is verified successfully, the vehicle is enabled to travel according to the guide path to leave the trap area. For example, the guide path may be verified by the monitoring platform. Only when the guide path is verified successfully, the path information indicative of the guide path is transmitted to the vehicle. Correspondingly, the aforementioned operation control may be, for example, a "submit to verify" control. In response to the operation of the operation control, the monitoring platform enters the process of verifying the guide path.

Figure 7:
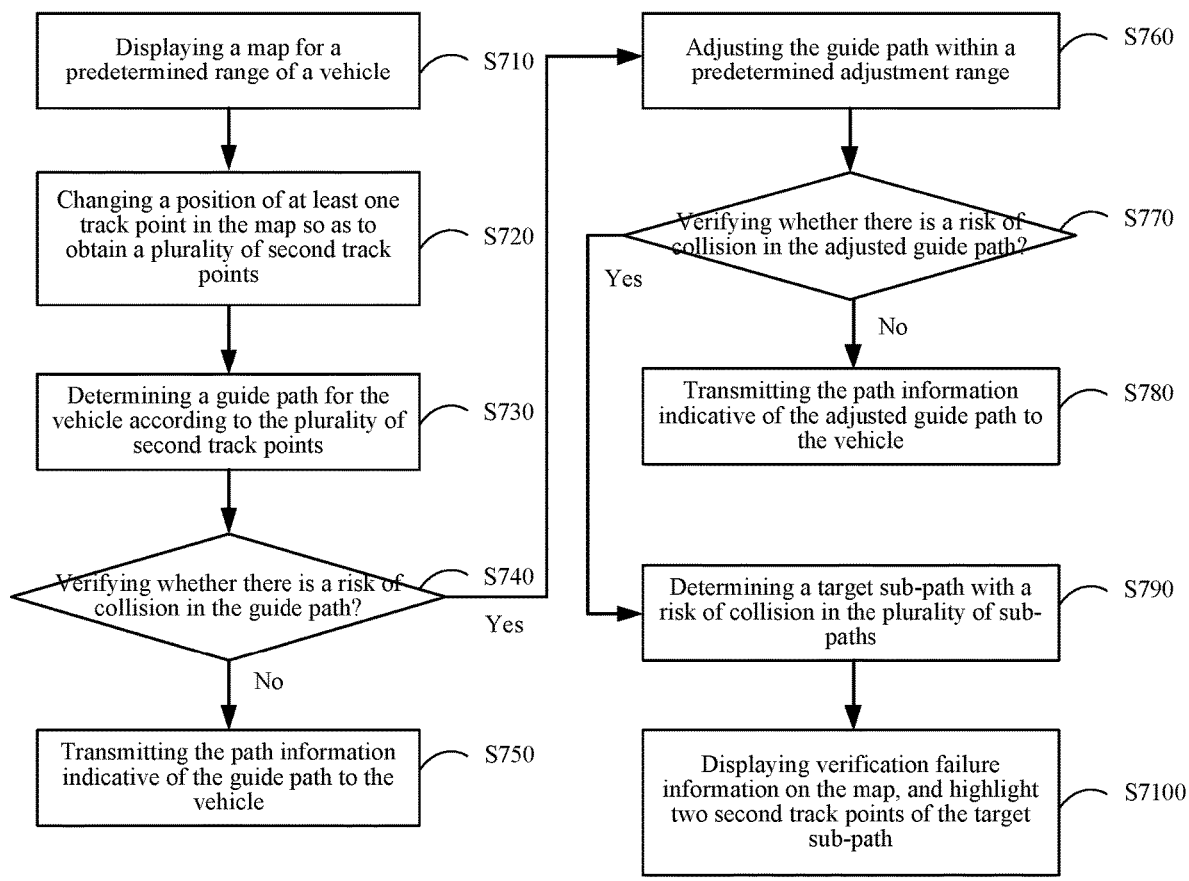
FIG. 7 shows a schematic flowchart of a method of determining a guide path according to another embodiment of the present disclosure.

FIG. 7 shows a schematic flowchart of a method of determining a guide path according to another embodiment of the present disclosure.

In an embodiment, as shown in FIG. 7, a method 700 of determining a guide path of this embodiment may include, for example, operation S710 to operation S750.

In operation S710, displaying a map for a predetermined range of a vehicle. The operation S710 is similar to the above-mentioned operation of displaying the map, and will not be repeated here.

In operation S720, changing a position of at least one track point in the map so as to obtain a plurality of second track points. The operation S720 is similar to the above-mentioned operation of obtaining the second track points, and will not be repeated here.

In operation S730, determining a guide path for the vehicle according to the plurality of second track points. The operation S720 is similar to the above-mentioned operation of determining the guide path, and will not be repeated here.

In operation S740, verifying whether there is a risk of collision in the guide path for the vehicle.

In the case where it is verified that there is no risk of collision in the guide path for the vehicle, operation S750 is performed to transmit the path information indicative of the guide path to the vehicle. The operation S750 is similar to the above-mentioned operation of transmitting the path information to the vehicle, and will not be repeated here. In the case where it is verified that there is a risk of collision in the guide path for the vehicle, the verification failure information is directly displayed to prompt the assistant person to further adjust the positions of the track points.

Exemplarily, the monitoring platform may obtain parameters such as a body width and a body length of the vehicle from pre-stored vehicle information, for example, according to the identification information of the autonomous vehicle contained in the guide request. Then, it is determined, according to these parameters, whether there is a risk of collision with the obstacle in the map when the vehicle travels along the guide path. Whether there is a risk of collision may be determined, for example, by determining whether the minimum distance between the vehicle and the obstacle is less than a predetermined distance during a simulation of the vehicle traveling along the guide path. If it is less than the predetermined distance, it is determined that there is a risk of collision. The predetermined distance may be a value greater than 0.05 m, such as 0.2 m, 0.1 m, 0.05 m, or the like. The predetermined distance may be set according to actual needs and is not limited in the present disclosure.

Exemplarily, the monitoring platform may further obtain real-time environmental information, and determine, according to the real-time environmental information, whether the vehicle is at risk of colliding with a vehicle on the opposite lane in the current environmental state. Specifically, it may be assumed that a speed of the vehicle along the guide path is $v_1$, and a speed of the vehicle on the opposite lane is $v_2$. The position of the vehicle in the guide path when the two vehicles meet is determined according to $v_1$, $v_2$ and the distance between the vehicle and the vehicle on the opposite lane. Then, it is determined whether there is a risk of collision based on the distance between the position and the boundary of the opposite lane. The real-time environmental information may be obtained by real-time communication between the terminal installed with the monitoring platform and the monitors on both sides of the road.

Exemplarily, if it is determined that there is a risk of collision in the guide path, the monitoring platform may, for example, highlight the section of the displayed guide path in which there is a risk of collision, so as to provide assistant information for the assistant person to adjust the guide path. Specifically, since the guide path is determined by the plurality of second track points, the guide path may be divided into a plurality of sub-paths by the plurality of second track points, and each sub-path is directed to two adjacent second track points. That is, each sub-path is obtained by connecting two adjacent second track points. For example, if there are five second track points, then four sub-paths are obtained. In this embodiment, for example, a target sub-path with a risk of collision in the plurality of sub-paths may be determined while determining whether there is a risk of collision in the guide path. Then the verification failure information is displayed on the map, and the two second track points of the target sub-path are highlighted. In another embodiment, for example, the target sub-path may also be highlighted in the map.

In an embodiment, the method 700 of determining the guide path may further include, for example, operation S760 to operation S780 that may be performed when it is verified that there is a risk of collision in the guide path.

In operation S760, adjusting the guide path within a predetermined adjustment range so as to obtain an adjusted guide path.

In operation S770, verifying whether there is a risk of collision in the adjusted guide path.

Exemplarily, for example, the monitoring platform may perform a fine adjustment on the positions of the plurality of second track points in the guide path so as to achieve the adjustment of the guide path. The predetermined adjustment range may be, for example, a range in which the positions of the second track points are adjusted. The adjustment range may be, for example, 1 cm, which means that the position of the second track point may be adjusted within a circle with a radius of 1 cm on the display page with the current position of the second track point as the center. The adjustment process may be, for example, a process of continuous iterative optimization, with the optimization purpose that there is no risk of collision in the guide path determined according to the adjusted second track points. If the adjusted guide path without a risk of collision is not obtained through the optimization, it is determined that a verification result of operation S770 is that there is a risk of collision in the adjusted guide path, and verification failure information is displayed to prompt the assistant person to further adjust the track points. If the adjusted guide path without the risk of collision is obtained through the optimization, operation S780 is performed to transmit the path information indicative of the adjusted guide path to the vehicle. The operation S780 is similar to the operation S750, and will not be repeated here.

In an embodiment, the method 700 of determining the guide path may further include, for example, operation S790 to operation S7100 that may be performed if it is verified that there is a risk of collision in the adjusted guide path.

In operation S790, determining a target sub-path with a risk of collision in the plurality of sub-paths.

In operation S7100, displaying the verification failure information on the map, and highlight the two second track points of the target sub-path. In another embodiment, the target sub-path may be highlighted, or both the target sub-path and the two second track points of the target sub-path may be highlighted.

According to an embodiment of the present disclosure, in the operation S790, the sub-path including the section with the risk of collision is determined as the target sub-path according to the section determined in the operation S770.

Exemplarily, the verification failure information displayed on the map may be an information prompt box, for example. Correspondingly, the remote guide process may further include, for example, a "path verification" process step to perform the operation S740, operation S760 to operation S780, and/or operation S790 to operation S7100 in the method of this embodiment.

In the embodiment of the present disclosure, by verifying the guide path and transmitting the path information to the vehicle only when the guide path passes the verification, the safety of the vehicle traveling along the guide path may be ensured and the accuracy of the guide path may be improved.

According to the embodiment of the present disclosure, the guide path determined may be verified, and only when the guide path passes the verification, the vehicle is enabled to travel according to the guide path to leave the trap area. For example, the verification of the guide path may be performed by the autonomous vehicle. Only when the guide path passes the verification, the vehicle travels according to the path information. Through the verification of the guide path by the autonomous vehicle, the rationality and implementability of the guide path may be ensured, thereby ensuring that the vehicle may travel along the guide path.

In an embodiment, in addition to the operations described above, the method of controlling driving of the vehicle performed by the autonomous vehicle may further include an operation of verifying whether the vehicle is allowed to travel along the guide path according to body parameters of the vehicle. In the case where it is verified that the vehicle is allowed to travel along the guide path, the vehicle travels along the guide path according to the path information transmitted by the monitoring platform. The body parameters of the vehicle may include, for example, a minimum turning radius of the vehicle, according to which it may be determined whether a turning ability of the vehicle may satisfy the requirement of a turning in the guide path. If the requirement of a turning in the guide path is satisfied, it is determined that the vehicle is allowed to travel along the guide path. If the requirement of a turning in the guide path is not satisfied, the vehicle may, for example, transmit a path re-planning request to the monitoring platform, so that the monitoring platform adjusts the positions of the second track points in response to receiving the path re-planning request so as to re-plan the guide path.

Exemplarily, in addition to the minimum turning radius of the vehicle, the body parameters of the vehicle may further include the minimum allowable speed of the vehicle, a body width of the vehicle, a body length of the vehicle, and other parameters. These parameters may be obtained from the cloud by the vehicle, or obtained from a local storage. The minimum turning radius refers to a radius of a track circle that a center of an outer steering wheel rolls on a support plane when a steering wheel turns to a limit position and the vehicle turns at the lowest stable speed. It may be understood that the vehicle body parameters considered above are only examples to facilitate understanding of the present disclosure, and are not limited in the present disclosure.

In an embodiment, in the case where it is verified that the autonomous vehicle is allowed to travel along the guide path, the autonomous vehicle may, for example, firstly transmit verification success information to the monitoring platform. Whether the vehicle is allowed to travel along the guide path is determined by the monitoring platform. Accordingly, the method of determining the guide path performed by the monitoring platform may further include the operations of: firstly obtaining real-time environmental information in response to receiving the verification success information transmitted by the vehicle; then determining whether the real-time environmental information satisfies the driving conditions of the vehicle according to the guide path for the vehicle; and transmitting a start instruction to the vehicle to enable the vehicle to travel along the guide path if it is determined that the driving conditions are satisfied. Since the monitoring platform monitors a wider range of sight than the vehicle's camera, this embodiment may prevent the case that the environmental information obtained by the vehicle is incomplete due to the limited vehicle's collection range, which case results in the case that a result of determining whether the driving condition is satisfied is not accurate. Therefore, the safety of the vehicle traveling along the guide path may be effectively ensured.

Exemplarily, the real-time environmental information may be obtained by real-time communication between the terminal installed with the monitoring platform and the monitors on both sides of the road. The driving conditions of the vehicle may include, for example, that the distance between the autonomous vehicle and a vehicle in the opposite lane is greater than a preset distance. The preset distance may be set according to the maximum allowable speed of the road where the autonomous vehicle is located, for example. If the maximum allowable speed is high, the preset distance is long. A value of the preset distance may be set, for example, on the premise that the vehicle in the opposite lane will not intersect with the vehicle when the vehicle is traveling along the guide path.

Exemplarily, after the vehicle receives the start instruction transmitted by the monitoring platform, for example, the mode of the vehicle may be switched from the assistant-driving mode to the autonomous-driving mode, so that the vehicle may perform the path planning according to the environmental information collected by the camera, thereby performing autonomous driving.

According to the embodiment of the present disclosure, while the vehicle is traveling along the guide path, the monitoring platform may continuously monitor the driving of the vehicle. In the case of monitoring that the vehicle has traversed the guide path completely, the monitoring platform may, for example, transmit an autonomous-driving instruction to the vehicle to switch the mode of the vehicle from the assistant-driving mode back to the autonomous-driving mode, so that the vehicle automatically plans the driving path in the subsequent driving process, thus reducing the manual intervention of the autonomous vehicle. After the mode of the vehicle is switched back to the autonomous-driving mode, the vehicle may perform path planning according to the environmental information around the vehicle collected by the camera and travel along the planned path. If the vehicle still fails to plan the path, it may transmit a guide request to the monitoring platform so that the monitoring platform performs the assistant driving.

According to the embodiment of the present disclosure, in the case where the monitoring platform monitors that the vehicle has traversed the guide path completely, for example, the monitoring platform may firstly determine the current position of the vehicle and the real-time environmental information. The current position of the vehicle is exactly an end position of the guide path. Then, it is determined, according to the current position information, whether the real-time environment information satisfies the autonomous-driving condition of the vehicle. For example, whether the real-time environmental information includes an obstacle larger than a predetermined size in front of the vehicle may be detected, and if not, it is determined that the autonomous-driving condition of the vehicle is satisfied. The predetermined size may be preset according to, for example, a width of the road where the vehicle is located. For example, it may further be detected whether the real-time environmental information includes a predetermined sign used to, for example, indicate road construction ahead and/or traffic control ahead. In the case of no predetermined sign, it is determined that the autonomous-driving condition of the vehicle is satisfied. Finally, if the autonomous-driving condition of the vehicle is satisfied, an autonomous-driving instruction is transmitted to the vehicle to enable autonomous driving of the vehicle. By determining whether the autonomous-driving condition is satisfied by the monitoring platform before transmitting the autonomous-driving instruction, it is possible to avoid the situation that the vehicle cannot accurately determine whether the autonomous-driving conditions are satisfied due to the limitation of the camera's collection range, thereby improving the driving safety of the vehicle.

Exemplarily, after the vehicle receives the autonomous-driving instruction transmitted by the monitoring platform, for example, the vehicle may first be switched from the autonomous-driving mode to the assistant-driving mode, so as to enable the vehicle to travel along the guide path indicated by the path information. The assistant-driving mode differs from the autonomous-driving mode in that the vehicle does not need to plan a driving path, but determines the driving path according to the path information received.

According to the embodiment of the present disclosure, when the monitoring platform determines that the real-time environmental information does not satisfy the autonomous-driving condition, for example, the assistant person may be instructed to further plan the guide path. The method of determining the guide path may further include, for example, the operation of displaying a plurality of third track points for the current position of the vehicle in the map in response to a target operation on the map if it is determined that the real-time environmental information does not satisfy the autonomous-driving condition, so as to re-determine the guide path for the vehicle. The method of re-determining the guide path for the vehicle is similar to the above-mentioned method of determining the guide path for the vehicle, and will not be repeated here.

Exemplarily, when the monitoring platform determines that the real-time environmental information does not satisfy the autonomous-driving condition, a target control indicative of whether to further plan the guide path may be displayed on the display page. In response to the click operation of the target control by the input device, the map is updated according to the current position of the vehicle, and the plurality of third track points for the current position of the vehicle are displayed in the updated map.

Figure 8:
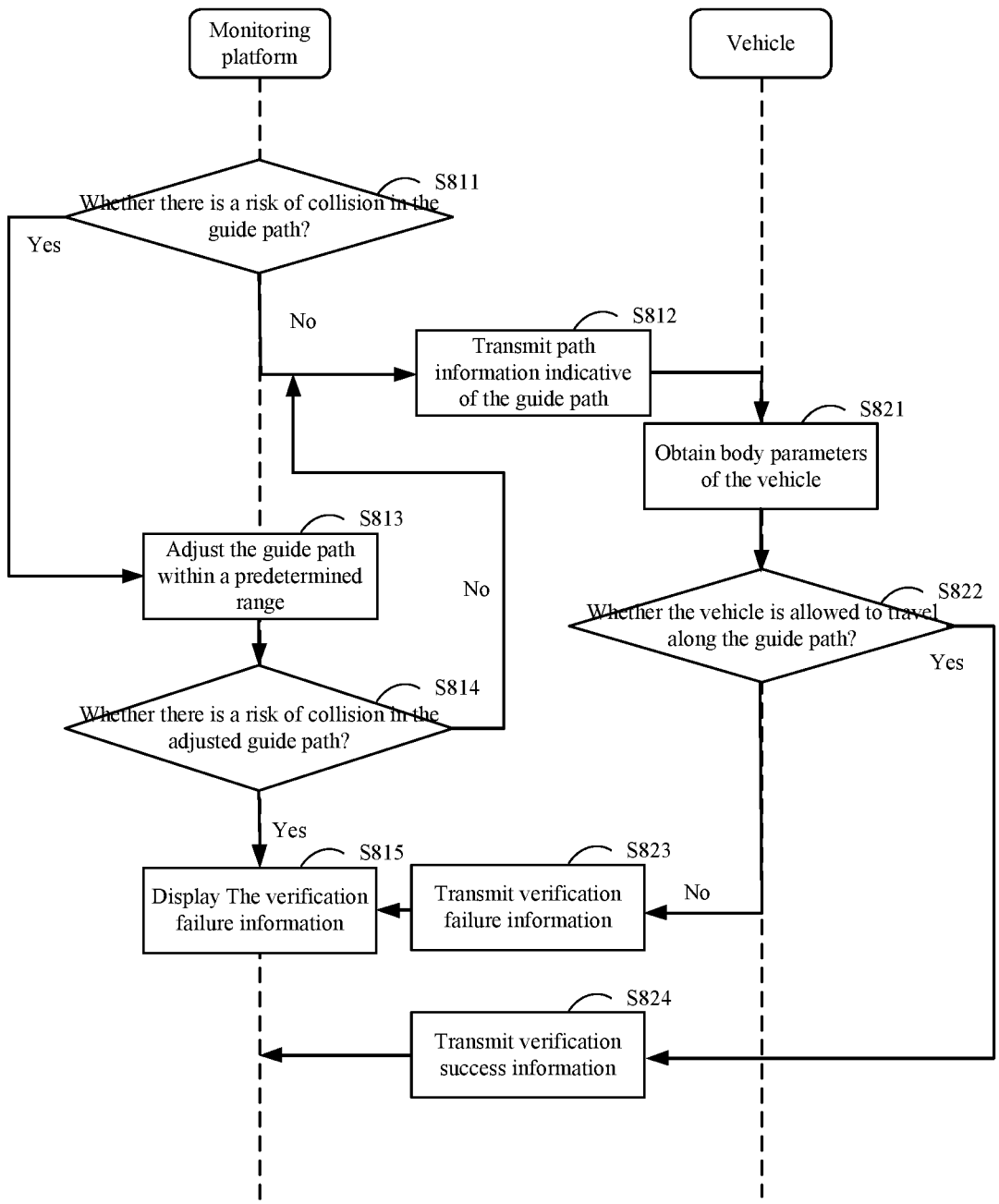
FIG. 8 shows a schematic flowchart of verifying a guide path according to an embodiment of the present disclosure.

FIG. 8 shows a schematic flowchart of verifying a guide path according to an embodiment of the present disclosure.

As shown in FIG. 8, in this embodiment, a process 800 of verifying the guide path may include, for example, operation S811 to operation S815 performed by the monitoring platform, and operation S821 to operation S824 performed by the vehicle.

In operation S811, verifying whether there is a risk of collision in the guide path. If it is determined that there is no risk of collision, operation S812 is performed. If it is determined that there is a risk of collision, operation S813 is performed.

In operation S812, transmitting the path information indicative of the guide path to the vehicle.

In operation S813, adjusting the guide path within the predetermined range so as to obtain the adjusted guide path. Then operation S814 is performed.

In operation S814, verifying whether there is a risk of collision in the adjusted guide path. If there is no risk of collision in the adjusted guide path, operation S812 is performed to transmit the path information indicative of the adjusted guide path. If there is a risk of collision in the adjusted guide path, operation S815 is performed.

In operation S815, displaying the verification failure information. In operation S815, for example, a target sub-path with a risk of collision may be determined first, then the verification failure information is displayed, and the two second track points of the target sub-path are highlighted.

After the vehicle receives the path information, it performs a secondary verification on the guide path indicated by the path information. Operation S821 is first performed to obtain body parameters of the vehicle. Then operation S822 is performed.

In operation S822, verify, according to the vehicle body parameters, whether the vehicle is allowed to travel along the guide path. If it is determined that the vehicle is not allowed to travel along the guide path, operation S823 is performed. If it is determined that the vehicle is allowed to travel along the guide path, operation S824 is performed.

In operation S823, transmitting the verification failure information to the monitoring platform, so that the monitoring platform performs operation S815.

In operation S824, transmitting the verification success information to the monitoring platform, so that the monitoring platform transmits a start instruction.

In the embodiment of the present disclosure, a first verification is performed by the monitoring platform, and a second verification is performed by the autonomous vehicle. The start instruction is transmitted to the vehicle only when the two verifications are successful. This may effectively ensure the correctness and safety of the guide path, thereby ensuring that the vehicle may eventually get out of trouble and return to the autonomous-driving state.

Exemplarily, the guide path obtained by the monitoring platform in this embodiment may satisfy the aforementioned preset conditions, for example. In this way, the final guide path along which the vehicle travels is obtained through three verifications, which may further ensure the correctness and safety of the guide path.

Figure 9:
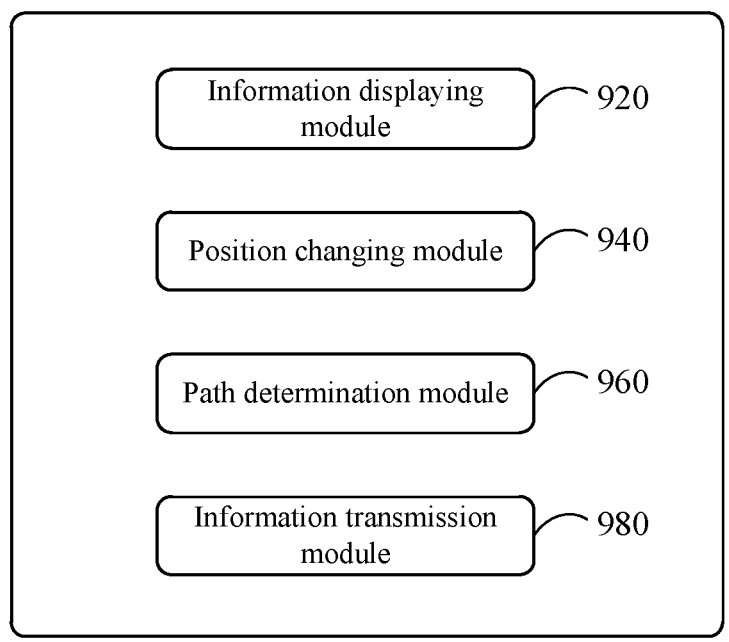
FIG. 9 shows a structural block diagram of an apparatus of determining a guide path according to an embodiment of the present disclosure.

FIG. 9 shows a structural block diagram of an apparatus of determining a guide path according to an embodiment of the present disclosure.

As shown in FIG. 9, an apparatus 900 of determining a guide path of this embodiment includes an information displaying module 920, a position changing module 940, a path determination module 960 and an information transmission module 980.

The information displaying module 920 is configured to display a map for a predetermined range of the vehicle in response to receiving the guide request transmitted by the vehicle, and the map includes a plurality of first track points for the vehicle.

The position changing module 940 is configured to change a position of at least one of the plurality of first track points in the map in response to a target operation on the at least one first track point, so as to obtain a plurality of second track points.

The path determination module 960 is configured to determine the guide path for the vehicle according to the plurality of second track points.

The information transmission module 980 is configured to transmit the path information indicative of the guide path to the vehicle so as to enable the vehicle to travel along the guide path.

Figure 10:
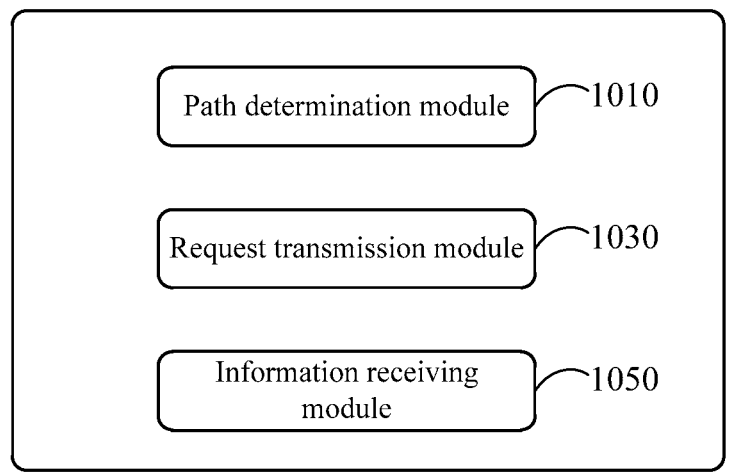
FIG. 10 shows a structural block diagram of an apparatus of controlling driving of a vehicle according to an embodiment of the present disclosure.

FIG. 10 shows a structural block diagram of an apparatus of controlling driving of a vehicle according to an embodiment of the present disclosure.

As shown in FIG. 10, an apparatus 1000 of controlling driving of the vehicle in this embodiment may include a path determination module 1010, a request transmission module 1030, and an information receiving module 1050.

The path determination module 1010 is configured to determine, according to the environmental information of the road ahead, whether a driving path of the road ahead has been planned or not, when the vehicle is in the autonomous-driving mode.

The request transmitting module 1030 is configured to transmit the guide request to the monitoring platform if the driving path of the road ahead hasn't been planned by the path determination module 1010.

The information receiving module 1050 is configured to receive the path information transmitted by the monitoring platform in response to the guide request, so as to enable the vehicle to travel along the guide path indicated by the path information.

According to the embodiments of the present disclosure, the present disclosure further provides an electronic device and a readable storage medium.

Figure 11:
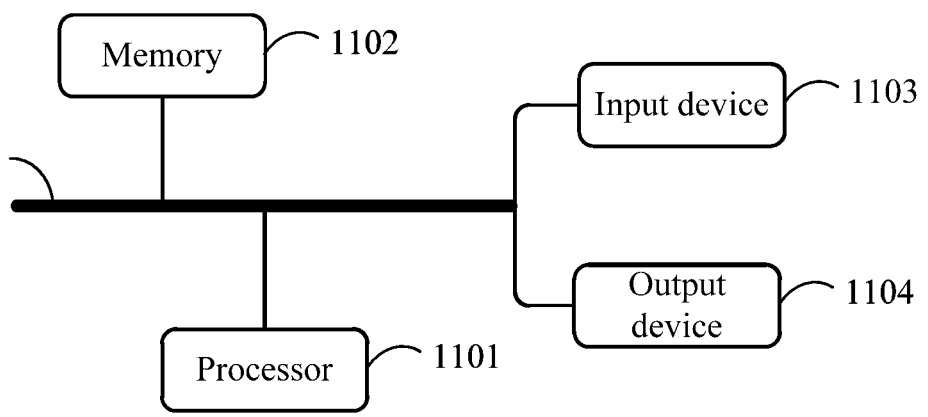
FIG. 11 shows a block diagram of an electronic device for implementing the method of determining the guide path or the method of controlling driving of the vehicle according to the embodiments of the present disclosure.

FIG. 11 shows a block diagram of an electronic device for implementing the method of determining the guide path or the method of controlling driving of the vehicle according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, an electronic device 1100 may include one or more processors 1101, a memory 1102, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device providing a part of necessary operations (for example, as a server array, a group of blade servers, or a multi-processor system). In FIG. 11, a processor 1101 is illustrated by way of example.

The memory 1102 is a non-transitory computer-readable storage medium provided by the present disclosure. The memory stores instructions executable by at least one processor, to cause the at least one processor to perform the method of determining the guide path or the method of controlling driving of the vehicle provided in the present disclosure. The non-transitory computer-readable storage medium of the present disclosure stores computer instructions for allowing a computer to execute the method of determining the guide path or the method of controlling driving of the vehicle provided in the present disclosure.

The memory 1102, as a non-transitory computer-readable storage medium, may be used to store non-transitory software programs, non-transitory computer-executable programs and modules, such as program instructions/modules corresponding to the method of determining the guide path or the method of controlling driving of the vehicle in the embodiments of the present disclosure (for example, the information displaying module 920, the position changing module 940, the path determination module 960 and the information transmission module 980 shown in FIG. 9, or the path determination module 1010, the request transmission module 1030 and the information receiving module 1050 shown in FIG. 10). The processor 1101 executes various functional applications and data processing of the server by executing the non-transient software programs, instructions and modules stored in the memory 1102, thereby implementing the method of determining the guide path or the method of controlling driving of the vehicle in the embodiments of the method mentioned above.

The memory 1102 may include a program storage area and a data storage area. The program storage area may store an operating system and an application program required by at least one function. The data storage area may store data etc. generated by using the electronic device 1100 according to the method of determining the guide path or the method of controlling driving of the vehicle. In addition, the memory 1102 may include a high-speed random access memory, and may further include a non-transitory memory, such as at least one magnetic disk storage device, a flash memory device, or other non-transitory solid-state storage devices. In some embodiments, the memory 1102 may optionally include a memory provided remotely with respect to the processor 1101, and such remote memory may be connected through a network to the electronic device for the method of determining the guide path or the method of controlling driving of the vehicle. Examples of the above-mentioned network include, but are not limited to the Internet, intranet, local area network, mobile communication network, and combination thereof.

The electronic device for the method of determining the guide path or the method of controlling driving of the vehicle may further include an input device 1103 and an output device 1104. The processor 1101, the memory 1102, the input device 1103 and the output device 1104 may be connected by a bus or in other manners. In FIG. 11, the connection by a bus is illustrated by way of example.

The input device 1103 may receive input information of numbers or character, and generate key input signals related to user settings and function control of the electronic device 1100 for the method of determining the guide path or the method of controlling driving of the vehicle, such as a touch screen, a keypad, a mouse, a track pad, a touchpad, a pointing stick, one or more mouse buttons, a trackball, a joystick, and so on. The output device 1104 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the protection scope of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

The invention claimed is:

1. A method of determining a guide path performed by a terminal, comprising:
displaying a map for a predetermined range of a vehicle, which is in remote communication with the terminal, in response to receiving a guide request transmitted by the vehicle, wherein the map comprises a plurality of first track points for the vehicle;
changing a position of at least one of the plurality of first track points in the map in response to a target operation on the at least one first track point, so as to obtain a plurality of second track points;

determining the guide path for the vehicle based on the plurality of second track points; and transmitting path information indicative of the guide path to the vehicle, wherein the vehicle is controlled to autonomously travel along the guide path, wherein the changing the position of the at least one of the plurality of first track points in the map so as to obtain the plurality of second track points comprises:

determining a real-time guide path based on current positions of the plurality of first track points, in response to changing a position of any of the at least one first track point;

determining whether the real-time guide path satisfies a preset condition or not; and displaying an operation control at a normal state in the map in response to determining that the real-time guide path satisfies the preset condition, so as to obtain the plurality of second track points in response to an operation on the operation control, wherein the operation control is displayed in a disabled state when the real-time guide path does not satisfy the preset condition;

wherein the determining whether the real-time guide path satisfies the preset condition or not comprises:

determining a maximum curvature value of the real-time guide path; and determining that the real-time guide path satisfies the preset condition if the maximum curvature value is not greater than a curvature threshold.

2. The method according to claim 1, wherein the determining whether the real-time guide path satisfies a preset condition or not further comprises:

determining a path length of the real-time guide path; and determining that the real-time guide path satisfies the preset condition if the maximum curvature value is not greater than the curvature threshold and the path length is not greater than a path length threshold.

3. The method according to claim 1, further comprising: prior to transmitting the path information indicative of the guide path to the vehicle, verifying whether there is a risk of collision in the guide path for the vehicle or not; and transmitting the path information indicative of the guide path to the vehicle, in response to verifying that there is no risk of collision in the guide path for the vehicle.

4. The method according to claim 3, further comprising: prior to transmitting the path information indicative of the guide path to the vehicle, adjusting the guide path within a predetermined adjustment range so as to obtain an adjusted guide path, in response to verifying that there is a risk of collision in the guide path for the vehicle; and transmitting path information indicative of the adjusted guide path to the vehicle, in response to verifying that there is no risk of collision in the adjusted guide path for the vehicle.

5. The method according to claim 4, wherein the guide path comprises a plurality of sub-paths for the plurality of second track points, and each sub-path is for an adjacent two of the plurality of second track points; and wherein the method further comprises:

determining a target sub-path with a risk of collision in the plurality of sub-paths, in response to verifying that there is a risk of collision in the adjusted guide path for the vehicle; and displaying verification failure information in the map, and highlighting two second track points of the target sub-path.

6. The method according to claim 1, further comprising: subsequent to transmitting the path information to the vehicle, acquiring real-time environmental information in response to receiving verification success information transmitted by the vehicle;

determining, based on the guide path for the vehicle, whether the real-time environmental information satisfies a driving condition of the vehicle or not; and transmitting a start instruction to the vehicle so as to enable the vehicle to travel along the guide path, in response to determining that the real-time environmental information satisfies the driving condition of the vehicle, wherein the verification success information indicates that the vehicle is allowed to travel along the guide path.

7. The method according to claim 1, further comprising:

determining current position information of the vehicle and real-time environmental information in response to monitoring that the vehicle traverses the guide path completely;

determining, based on the current position information, whether the real-time environmental information satisfies an autonomous-driving condition of the vehicle or not; and transmitting an autonomous-driving instruction to the vehicle so as to enable autonomous driving of the vehicle, in response to determining that the real-time environmental information satisfies the autonomous-driving condition of the vehicle.

8. The method according to claim 7, further comprising:

displaying a plurality of third track points for a current position of the vehicle in the map in response to a target operation on the map if the real-time environmental information does not satisfy the autonomous-driving condition of the vehicle, so as to further determine the guide path for the vehicle.

9. A method of controlling driving of a vehicle, comprising:

determining in an autonomous-driving mode of the vehicle, based on environmental information of a road ahead, whether a driving path of the road ahead has been planned or not;

transmitting a guide request to a monitoring platform, in response to determining that the driving path of the road ahead has not been planned; and receiving path information transmitted by the monitoring platform in response to the guide request, wherein the vehicle is controlled to autonomously travel along a guide path indicated by the path information, wherein the guide path is determined by the method of claim 1.

10. The method according to claim 9, further comprising: subsequent to receiving the path information, verifying, based on body parameters of the vehicle, whether the vehicle is allowed to travel along the guide path or not; and transmitting verification success information to the monitoring platform, in response to verifying that the vehicle is allowed to travel along the guide path.

11. The method according to claim 9, further comprising:

switching a mode of the vehicle from the autonomous-driving mode to an assistant-driving mode so as to enable the vehicle to travel along the guide path indicated by the path information, in response to receiving a start instruction transmitted by the monitoring platform; and switching the mode of the vehicle from the assistant-driving mode to the autonomous-driving mode so as to enable autonomous driving of the vehicle, in response to receiving an autonomous-driving instruction transmitted by the monitoring platform.

12. An electronic device, comprising:

at least one processor; and a memory in communication with the at least one processor;

wherein the memory stores instructions executable by the at least one processor, and wherein the instructions, when executed by the at least one processor, cause the at least one processor to:

display a map for a predetermined range of a vehicle, which is in remote communication with the electronic device, in response to receiving a guide request transmitted by the vehicle, wherein the map comprises a plurality of first track points for the vehicle;

change a position of at least one of the plurality of first track points in the map in response to a target operation on the at least one first track point, so as to obtain a plurality of second track points;

determine a guide path for the vehicle based on the plurality of second track points; and transmit path information indicative of the guide path to the vehicle, wherein the vehicle is controlled to autonomously travel along the guide path, wherein the at least one processor is further configured to:

determine a real-time guide path based on current positions of the plurality of first track points, in response to changing a position of any of the at least one first track point;

determine whether the real-time guide path satisfies a preset condition or not; and display an operation control at a normal state in the map in response to determining that the real-time guide path satisfies the preset condition, so as to obtain the plurality of second track points in response to an operation on the operation control, wherein the operation control is displayed in a disabled state when the real-time guide path does not satisfy the preset condition;

wherein the at least one processor is further configured to:

determine a maximum curvature value of the real-time guide path; and determine that the real-time guide path satisfies the preset condition if the maximum curvature value is not greater than a curvature threshold.

13. An electronic device, comprising:

at least one processor; and a memory in communication with the at least one processor;

wherein the memory stores instructions executable by the at least one processor, and wherein the instructions, when executed by the at least one processor, cause the at least one processor to:

determine in an autonomous-driving mode of the vehicle, based on environmental information of a road ahead, whether a driving path of the road ahead has been planned or not;

transmit a guide request to a monitoring platform, in response to determining that the driving path of the road ahead has not been planned; and receive path information transmitted by the monitoring platform in response to the guide request, wherein the vehicle is controlled to autonomously travel along the guide path indicated by the path information, wherein the guide path is determined by the electronic device of claim 12.

14. A non-transitory computer-readable storage medium having computer instructions stored thereon, wherein the computer instructions, when executed, cause a computer to:

display a map for a predetermined range of a vehicle, which is in remote communication with the computer, in response to receiving a guide request transmitted by the vehicle, wherein the map comprises a plurality of first track points for the vehicle;

change a position of at least one of the plurality of first track points in the map in response to a target operation on the at least one first track point, so as to obtain a plurality of second track points;

determine a guide path for the vehicle based on the plurality of second track points; and transmit path information indicative of the guide path to the vehicle, wherein the vehicle is controlled to autonomously travel along the guide path, wherein the at least one processor is further configured to:

determine a real-time guide path based on current positions of the plurality of first track points, in response to changing a position of any of the at least one first track point;

determine whether the real-time guide path satisfies a preset condition or not; and display an operation control at a normal state in the map in response to determining that the real-time guide path satisfies the preset condition, so as to obtain the plurality of second track points in response to an operation on the operation control, wherein the operation control is displayed in a disabled state when the real-time guide path does not satisfy the preset condition;

wherein the at least one processor is further configured to:

determine a maximum curvature value of the real-time guide path; and determine that the real-time guide path satisfies the preset condition if the maximum curvature value is not greater than a curvature threshold.

15. A non-transitory computer-readable storage medium having computer instructions stored thereon, wherein the computer instructions, when executed, cause a computer to:

determine in an autonomous-driving mode of the vehicle, based on environmental information of a road ahead, whether a driving path of the road ahead has been planned or not;

transmit a guide request to a monitoring platform, in response to determining that the driving path of the road ahead has not been planned; and receive path information transmitted by the monitoring platform in response to the guide request, wherein the vehicle is controlled to autonomously travel along the guide path indicated by the path information, wherein the guide path is determined by using the storage medium of claim 14.

* * * * *